United States Patent [19]

Nakamichi et al.

[11] Patent Number: 5,406,975
[45] Date of Patent: Apr. 18, 1995

[54] FLOW RATE CONTROL VALVE

[75] Inventors: Kazutaka Nakamichi; Takashi Kubota, both of Obu; Hitoshi Takeuchi, Chita, all of Japan

[73] Assignee: Aisan Kogyo Kabushiki Kaisha, Obu, Japan

[21] Appl. No.: 201,386

[22] Filed: Feb. 24, 1994

[30] Foreign Application Priority Data

Mar. 12, 1993 [JP] Japan ................................ 5-010741 U
Mar. 15, 1993 [JP] Japan ................................ 5-010824 U

[51] Int. Cl.6 ..................... F16K 31/10; F16K 31/365
[52] U.S. Cl. ................................ 137/495; 251/129.03
[58] Field of Search ........................... 137/599, 495; 251/129.03

[56] References Cited

U.S. PATENT DOCUMENTS

| | | | |
|---|---|---|---|
| 2,217,141 | 10/1940 | Sprenkle | 137/599 X |
| 3,035,774 | 5/1962 | Ray | 251/129.03 X |
| 3,442,287 | 5/1969 | Ray | 137/495 X |
| 3,810,489 | 5/1974 | MacManus et al. | 137/495 |
| 3,994,356 | 11/1976 | Smitley | 137/495 X |
| 4,180,241 | 12/1979 | Fiedler | 251/129.03 |
| 4,267,947 | 5/1981 | Wasserstrom | 251/129.03 X |
| 4,287,909 | 9/1981 | Tompson et al. | 137/495 X |

FOREIGN PATENT DOCUMENTS 55-100774 7/1980 Japan .
62-75182 4/1987 Japan .

*Primary Examiner*—Stephen M. Hepperle
*Attorney, Agent, or Firm*—Cushman, Darby & Cushman

[57] ABSTRACT

A flow rate control valve reduced in size and improved in mountability has a structure comprising a communicating passage which has openings on opposite ends and includes valve seats which surround the respective openings, an outflow port which communicates with an intermediate portion of the communicating passage, a first valve disk disposed at a corresponding position to one of the valve seats, a diaphragm connected to the first valve disk, a diaphragm chamber formed on one side of the diaphragm, a spring which urges the first valve disk in the valve closing direction, a second valve disk disposed at a corresponding position to the other valve seat, an electromagnetic solenoid which opens/closes the second valve disk, a valve chamber formed around the second valve disk, and an inflow port which communicates with the diaphragm chamber and the valve chamber.

4 Claims, 8 Drawing Sheets

FIG.8

FLOW RATE CONTROL VALVE

BACKGROUND OF THE INVENTION

The present invention relates to an improvement of a flow rate control valve.

Figure 8:
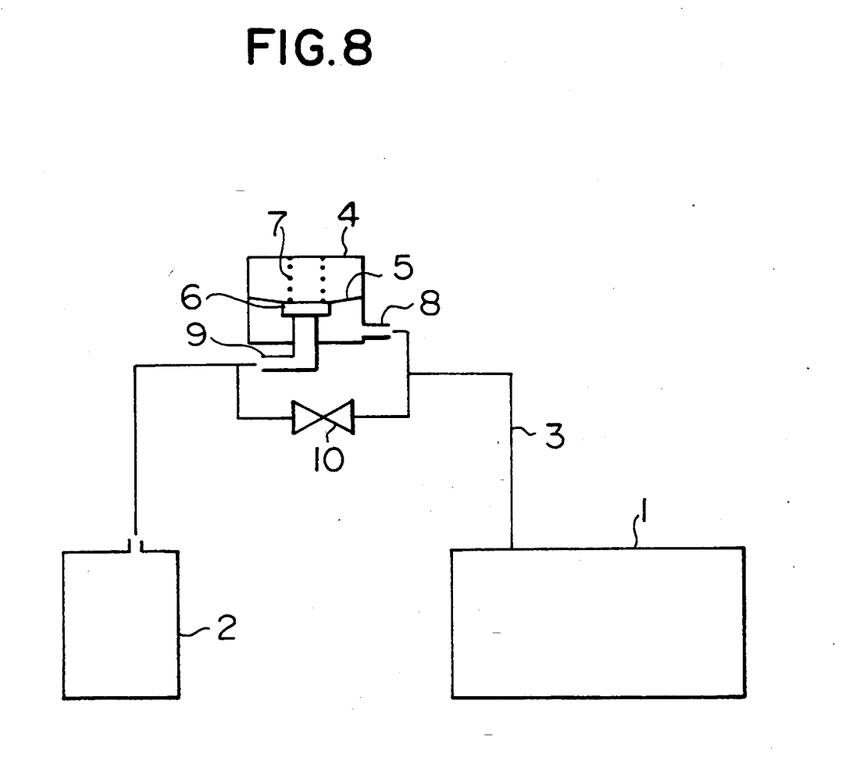
FIG. 8 is a simplified diagram showing a conventional flow rate control valve provided between a fuel tank and a canister in an automobile.

In an automobile, as shown in FIG. 8, a canister 2 containing activated carbon (an absorbent) to absorb evaporated fuel from a fuel tank 1 is connected with the fuel tank 1 through an evaporated fuel passage 3. A flow rate control valve 4 of a diaphragm type which is opened/closed in accordance with an internal pressure of the fuel tank 1 so as to control the flow rate of the evaporated fuel is inserted in the evaporated fuel passage 3. Also, an electromagnetic valve 10 which is closed normally but opened at the time of a diagnostic check is provided in parallel to the flow rate control valve 4.

Normally, the electromagnetic valve 10 is closed. When the tank internal pressure is a preset pressure or higher, a diaphragm 5 is raised against the force of a spring 7, and a valve disk 6 is moved upwardly to open the flow rate control valve 4. When the tank internal pressure is lower than the preset pressure, the valve disk 6 is pressed by the spring 7 and moved downwardly to close the flow rate control valve 4. The portion above the diaphragm 5 communicates with the atmosphere as an atmospheric pressure chamber. The tank internal pressure is exerted on the lower surface of the diaphragm 5.

An inflow port 8 and an outflow port 9 of the flow rate control valve 4 communicate with an upper portion of the fuel tank 1 and a tank port of the, canister 2, respectively.

The electromagnetic valve 10 is opened at the time of a diagnostic check and introduces a negative pressure into the fuel tank 1. In other words, at the time of a diagnostic check, the electromagnetic valve 10 is opened and functions as a bypass passage from the flow rate control valve 4.

A switch valve of a diaphragm type disclosed in Japanese Utility Model Unexamined Publication No. 55-100774 is known as the flow rate control valve (also referred to as a pressure control valve) 4, and a valve disclosed in Japanese Patent Unexamined Publication No. 62-75182, for example, is known as the electromagnetic valve 10.

In the conventional technique described above, the flow rate control valve (also referred to as the pressure control valve) 4 which is opened/closed in accordance with the internal pressure of the fuel tank, and the electromagnetic valve 10 for a bypass disposed in parallel to the flow rate control valve 4, are manufactured to have independent structures of and connected in parallel to each other. Consequently, there arises a first problem that a large space is required for mounting the valves.

Further, in the conventional technique, the valve disk 6 is sometimes adhered on the valve seat by viscous components included in the valve disk 6, or viscous components in a fluid sometimes attach to the valve disk 6 and the valve seat so that the valve will be likewise adhered. As a result, there arises a second problem that the flow rate valve 4 to be operated by the internal pressure in the fuel tank which is a relatively low pressure does not function; that is to say, adhesion of the valve makes it impossible to control the valve with a slight pressure.

SUMMARY OF THE INVENTION

It is a first object of the present invention in relation to the first problem to reduce the size of an entire structure and improve its mountability by integrating a flow rate control valve (a pressure control valve) with an electromagnetic valve (a bypass valve).

Further, it is a second object of the invention to provide a flow rate control valve which can solve the second problem.

In order to achieve the first object, a flow rate control valve according to the present invention has a first structure comprising:

a communicating passage which has openings on opposite ends and includes a first valve seat which surrounds one of the openings and a second valve seat which surrounds the other opening;

an outflow port which communicates with an intermediate portion of the connecting passage;

a first valve disk disposed at a corresponding position to the first valve seat; a diaphragm connected to the first valve disk; a diaphragm chamber formed on one side of the diaphragm; a spring which urges the first valve disk in the valve closing direction;

a second valve disk disposed at a corresponding position to the second valve seat; an electromagnetic solenoid which opens/closes the second valve disk; a valve chamber formed around the second valve disk; and an inflow port which communicates with the diaphragm chamber and the valve chamber.

Moreover, in order to achieve the first object, a flow rate control valve according to the invention has a second structure comprising:

a communicating passage which communicates with an outflow port on one end thereof and includes a valve seat which surrounds an opening on the other end;

a valve disk disposed at a corresponding position to the valve seat; a diaphragm which is connected to the valve disk and includes a diaphragm chamber formed on one side thereof; a first spring which urges the valve disk in the valve closing direction; a second spring which urges the valve disk in the valve opening direction and has a load stronger than the first spring;

an inflow port which communicates with the diaphragm chamber; and an electromagnetic solenoid which operates to open/close the valve disk.

Furthermore, in order to achieve the second object, a flow rate control valve according to the invention has a third structure having a spring which presses a valve disk formed on a diaphragm so as to bring it into contact with a valve seat, and an electromagnetic solenoid including a plunger which urges the valve disk in such a direction as to detach it from the valve seat against the force of the spring when the electromagnetic solenoid is energized, so that when the electromagnetic solenoid is not energized, the valve disk is detached from the valve seat by a degree in accordance with a pressure exerted on the diaphragm, to thereby control the flow rate.

With the first structure, when the electromagnetic solenoid is not energized and the second valve disk is open, the inflow port and the outflow port communicate with each other through the valve chamber, the second opening and the connecting passage. At this time, the first valve disk is closed due to the load of the spring.

When the electromagnetic solenoid is energized to press and close the second valve disk, the first valve disk is opened, against the force of the spring, by the pressure applied to the diaphragm chamber through the inflow port. Thus, the inflow port and the outflow port communicate with each other through the first opening.

With the second structure, when the electromagnetic solenoid is energized and the valve disk is not in the pressed and open state, the valve disk is opened, against the force of the first spring, by the pressure applied to the diaphragm chamber through the inflow port, thereby causing the inflow port and the outflow port to communicate with each other. In this manner, the valve opening degree is controlled in accordance with the pressure applied to the diaphragm chamber, so as to regulate the flow rate.

When the pressure applied to the diaphragm chamber is below a preset value while the electromagnetic solenoid is energized, the valve is closed due to the load of the first spring. However, when the electromagnetic solenoid is not energized, the second spring functions in such a manner that the valve disk is opened against the force of the first spring, thereby causing the inflow port and the outflow port to communicate with each other.

With the third structure, when the pressure applied to the diaphragm chamber exceeds a preset value while the electromagnetic solenoid is not energized, the valve disk is detached from the valve seat against the force of the spring so that the valve is opened by a degree in accordance with the pressure, to thereby control the flow rate.

When the electromagnetic solenoid is energized, the plunger detaches the valve disk from the valve seat with the electromagnetic force. Therefore, even if the valve is adhered, it is forcibly opened.

DETAILED DESCRIPTION OF THE PREFERRED EMBODIMENTS

The present invention will be hereinafter described in detail with reference to the attached drawings.

Figure 1:
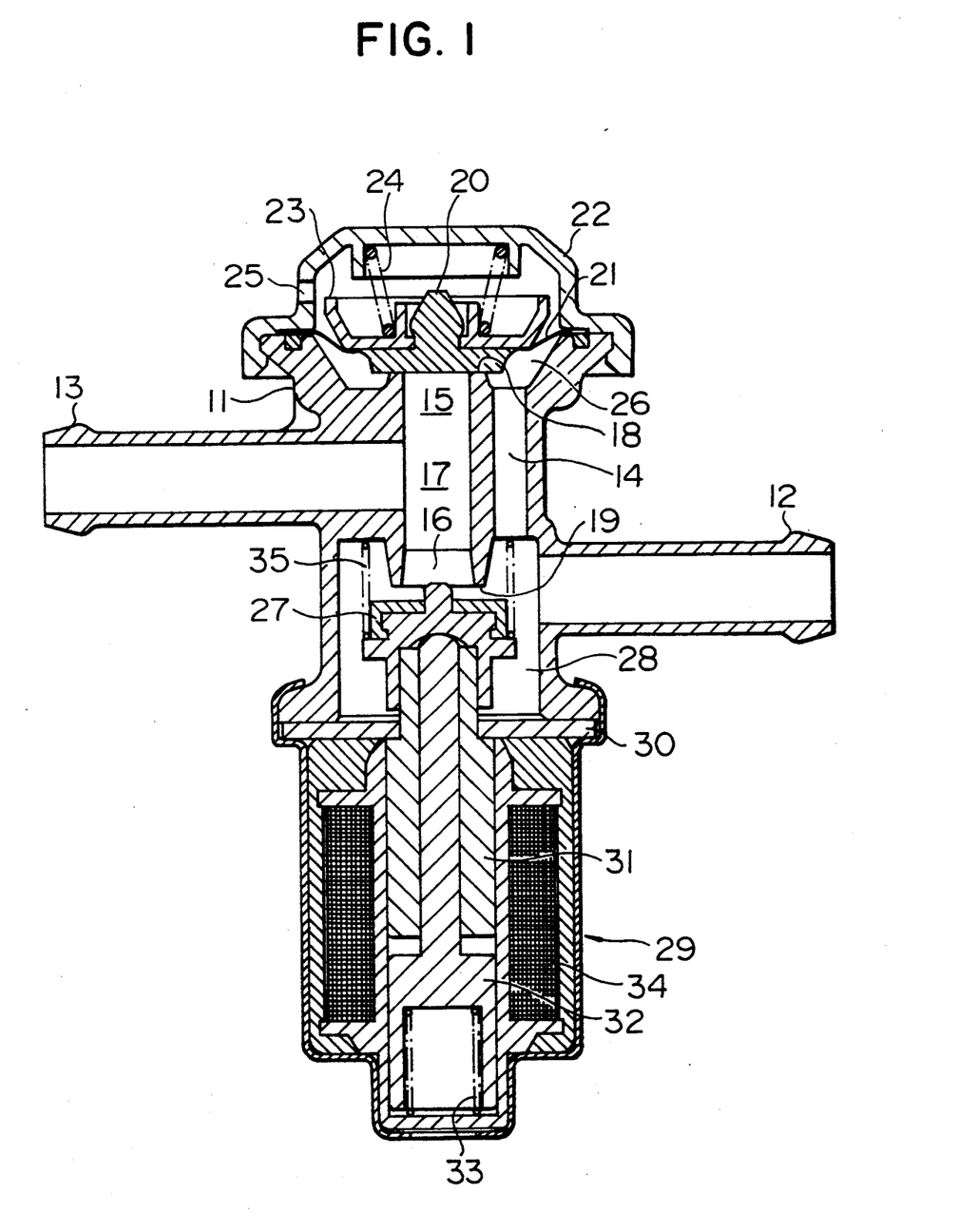
FIG. 1 is a vertical cross-sectional view showing a first embodiment according to the present invention.
Figure 2:
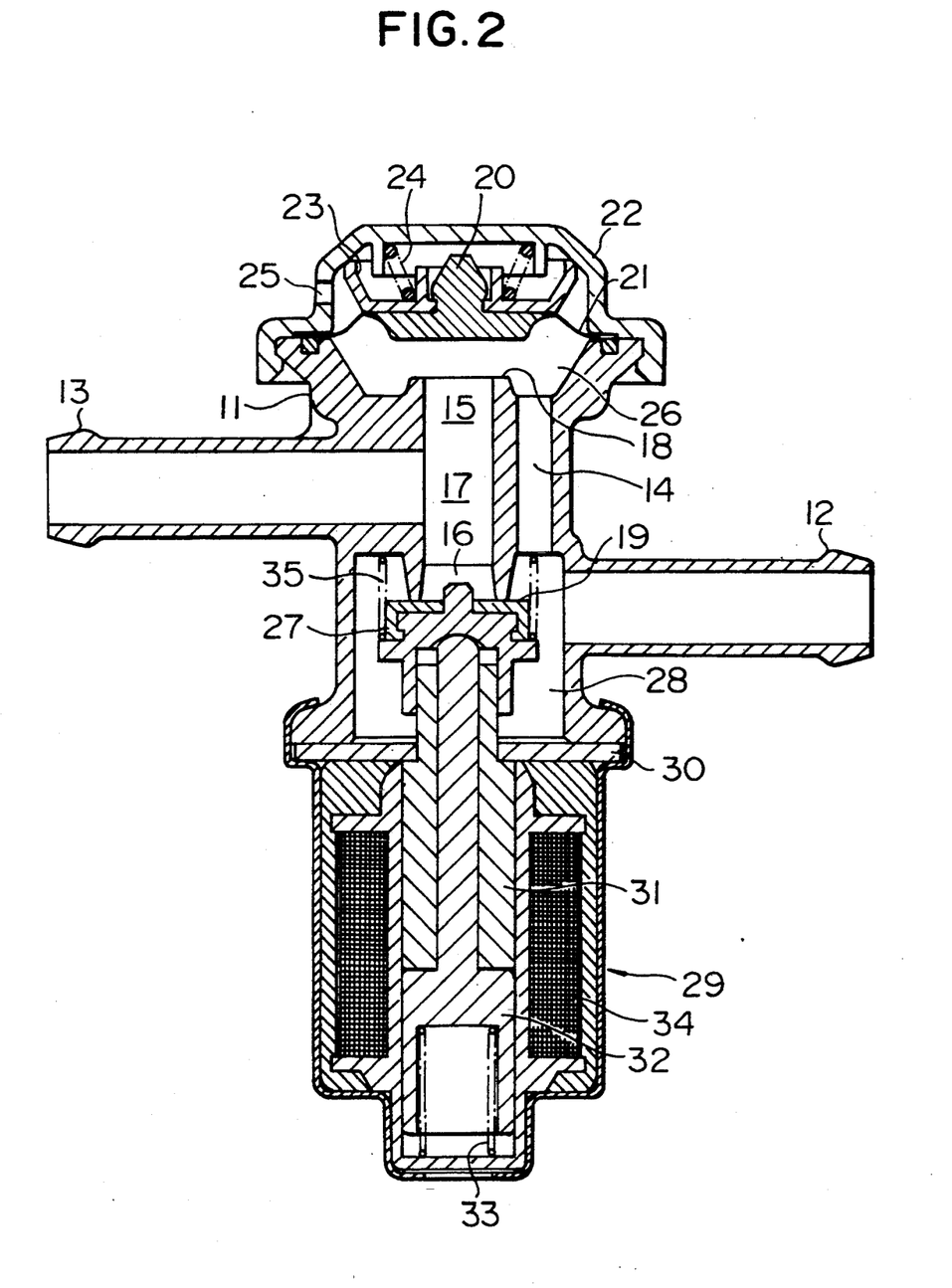
FIG. 2 is a view showing a different condition of the first embodiment in FIG. 1.

FIGS. 1 and 2 show a first embodiment according to the invention, in which reference numeral 11 denotes a valve body, 12 an inflow port, 13 an outflow port, and 14 a communicating passage. The communicating passage 14 has two openings, i.e., one opening 15 on the upper end and the other opening 16 on the lower end. The outflow port 13 communicates with an intermediate portion 17 in the communicating passage 14.

A first valve seat 18 surrounds the first opening 15 and is formed on the communicating passage 14. A second valve seat 19 surrounds the second opening 16 and is formed on the communicating passage 14.

A first valve disk 20 is formed integrally with a diaphragm 21 and provided at a corresponding position to the first valve seat 18. The outer peripheral edge of the diaphragm 21 is hermetically held between the body 11 and a cover 22.

A shell 23 is disposed in contact with the upper surface of a central portion of the diaphragm 21, and a spring 24 for urging the first valve disk 20 in the valve closing direction (downwardly) is interposed between the shell 23 and the cover 22. A vent hole 25 serves to maintain the portion above the diaphragm 21 at an atmospheric pressure.

A diaphragm chamber 26 is formed on the lower side of the diaphragm 21 and communicates with the inflow port 12.

A second valve disk 27 is provided at a corresponding position to the second valve seat 19, and a valve chamber 28 is formed around the second valve disk 27 and communicates with the inflow port 12.

An electromagnetic solenoid 29 for opening/closing the second valve disk 27 comprises a yoke 30 fixed on the body 11, a cylindrical stator 31 vertically secured in the center of the yoke 30 coaxially with the communicating passage 14, a plunger 32 penetrated through the stator 31 vertically slidably and including a rod whose upper end is engaged with the second valve disk 27, a compression spring 33 having a load which is at substantially the same level as the weight of the plunger 32, an excitation coil 34, a spring 35 for urging the second valve disk 27 in the valve opening direction (downwardly), and so forth. The electromagnetic solenoid 29 is secured on the lower portion of the valve body 11.

Figure 4:
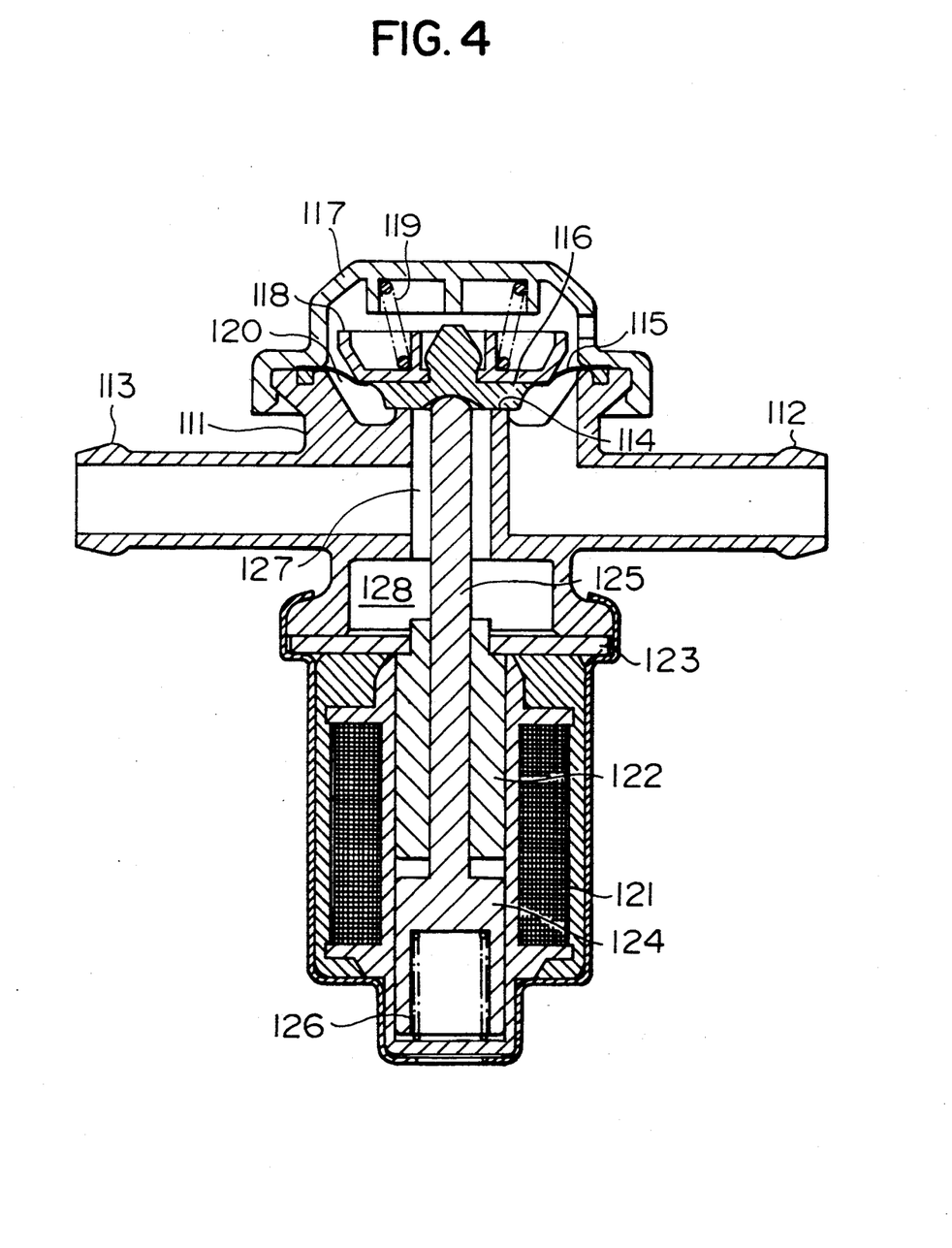
FIG. 4 is a vertical cross-sectional view showing a third embodiment according to the invention.

Now there will be described the operation in the case where the inflow port 12 and the outflow port 13 of the flow rate control valve in the first embodiment are connected to the fuel tank 1 and the canister 2 in such a manner as shown in FIG. 4 so as to control the flow rate of evaporated fuel.

The electromagnetic solenoid 29 is of a normal open type. Therefore, when the excitation coil 34 is not energized, the second valve disk 27 is pressed by the spring 35 and located at a lower position, as shown in FIG. 1, to thereby keep the valve open. In this state, the inflow port 12 and the outflow port 13 communicate with each other through the opening 16, thereby causing evaporated fuel to be absorbed by the canister. Further, at the time of a diagnostic check, the communication between these ports serves as a passage for introducing a negative pressure into the fuel tank. The valve chamber 28 functions to decrease the passage resistance.

When the excitation coil 34 is energized, the plunger 32 is attracted to the stator 31, and the second valve disk 27 is raised against the force of the spring 35 and pressed on the second valve seat 19 so as to close the valve (see FIG. 2).

In this state, the internal pressure in the fuel tank is applied to the diaphragm chamber 26 by way of the inflow port 12. When this pressure exceeds a preset value, the first valve disk 20 is raised against the force of the spring 24 so as to open the valve, as shown in FIG. 2. The opening degree of the valve at this time is determined in accordance with the internal pressure in the fuel tank, to thereby control the flow rate of evaporated fuel.

Figure 3:
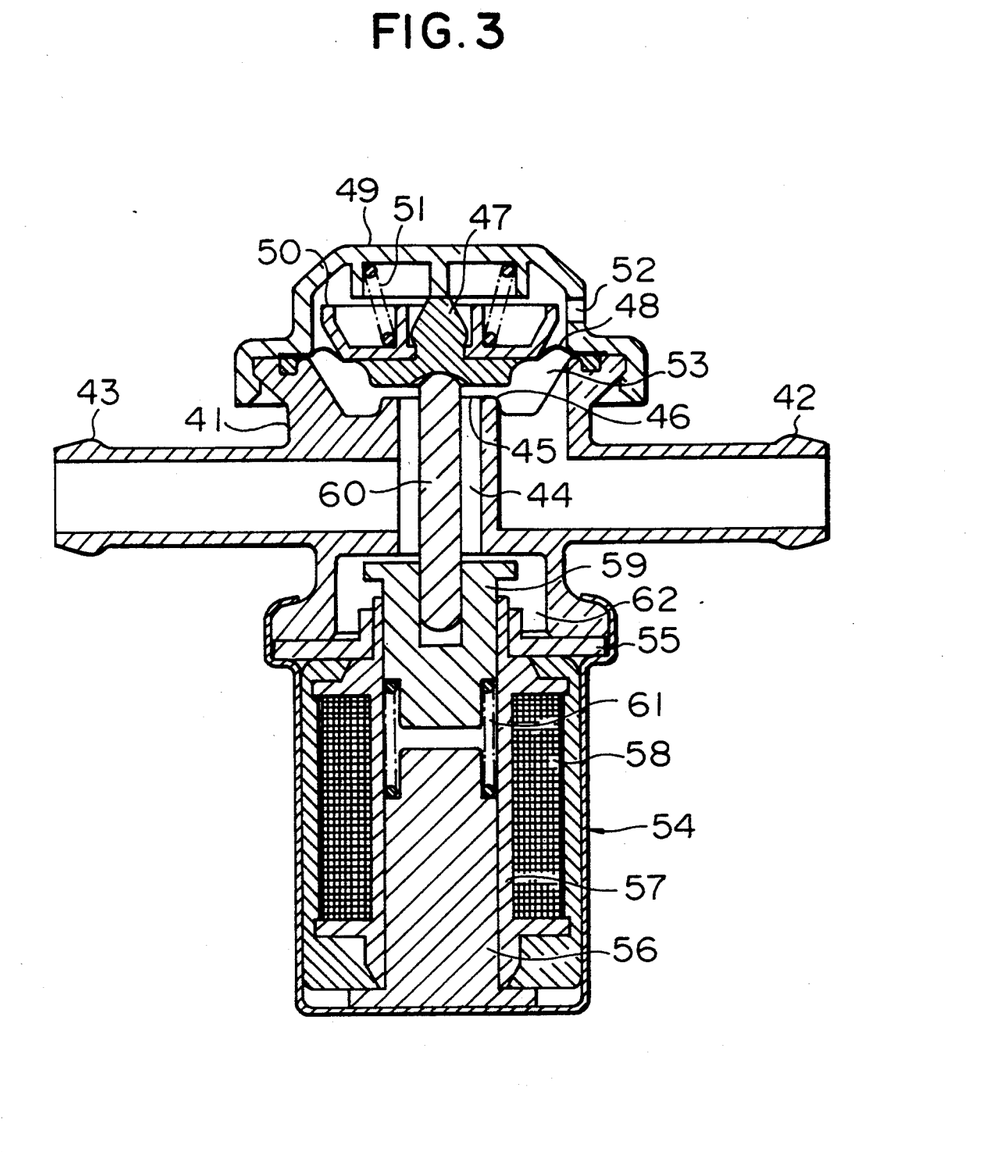
FIG. 3 is a vertical cross-sectional view showing a second embodiment according to the invention.

FIG. 3 shows a second embodiment according to the present invention, in which reference numeral 41 denotes a valve body, 42 an inflow port, 43 an outflow port, and 44 a communicating passage. One end of the communicating passage 44 communicates with the outflow port 43, and the communicating passage 44 includes a valve seat 46 which surrounds an opening 45 on the other end thereof.

A valve disk 47 is provided at a corresponding position to the valve seat 46 and formed integrally with a diaphragm 48. The outer peripheral edge of the diaphragm 48 is hermetically held between the body 41 and a cover 49.

A shell 50 is disposed in contact with the upper surface of a central portion of the diaphragm 48, and a spring 51 for urging the valve disk 47 in the valve closing direction (downwardly in FIG. 3) is interposed between the shell 50 and the cover 49. A vent hole 52 serves to maintain the portion above the diaphragm 48 at an atmospheric pressure.

A diaphragm chamber 53 is formed on the lower side of the diaphragm 48 and communicates with the inflow port 42.

An electromagnetic solenoid 54 which operates to open/close the valve disk 47 comprises a yoke 55 fixed on the body 41, a columnar stator 56 secured coaxially with the valve disk 47, a bobbin 57, an excitation coil 58, a plunger 59 vertically slidable in a through hole of the bobbin 57, a rod 60 press-fitted in the center of the plunger 59 coaxially and having an upper end engaged with the lower end of the valve disk 47, a spring 61 interposed between the plunger 59 and the stator 56 and having a stronger load than the spring 51, and so forth. The electromagnetic solenoid 54 is secured on the lower portion of the valve body 41.

An air damper chamber 62 is formed on the upper portion of the electromagnetic solenoid 54 and communicates with the communicating passage 44.

In the second embodiment, when the excitation coil 58 is not energized, the valve disk 47 is raised by the spring 61, as shown in FIG. 3, to thereby keep the valve open.

When the excitation coil 58 is energized, the plunger 59 is attracted to the stator 56 and moved downwardly against the force of the spring 61.

In this state, when the internal pressure in the fuel tank applied to the diaphragm chamber 53 is below a preset value, the valve disk 47 is moved downwardly due to the load of the spring 51, thus closing the valve. When the internal pressure in the fuel tank exceeds the preset value, the valve is opened in accordance with the internal pressure, to thereby control the flow rate of evaporated fuel.

The air damper chamber 62 prevents pulsation of the pressure of evaporated fuel which flows toward the outflow port 43, and improves the valve controllability.

In the second embodiment described above, the spring 61 interposed between the plunger 59 and the stator 56 so as to urge the valve disk 47 in the valve opening direction is designed to have a stronger load than the spring 51 to urge the valve disk 47 in the valve closing direction. Thus, with one valve disk, the second embodiment can perform substantially the same function as the first embodiment, and can be further reduced in size.

In the above-described structure, therefore, the valve body including a pair of inflow and outflow ports is integrally combined with the valve which operates in accordance with the diaphragm and the valve which operates in accordance with the electromagnetic solenoid. Thus, the structure as a whole can be reduced in size, and its mountability can be improved.

Figure 5:
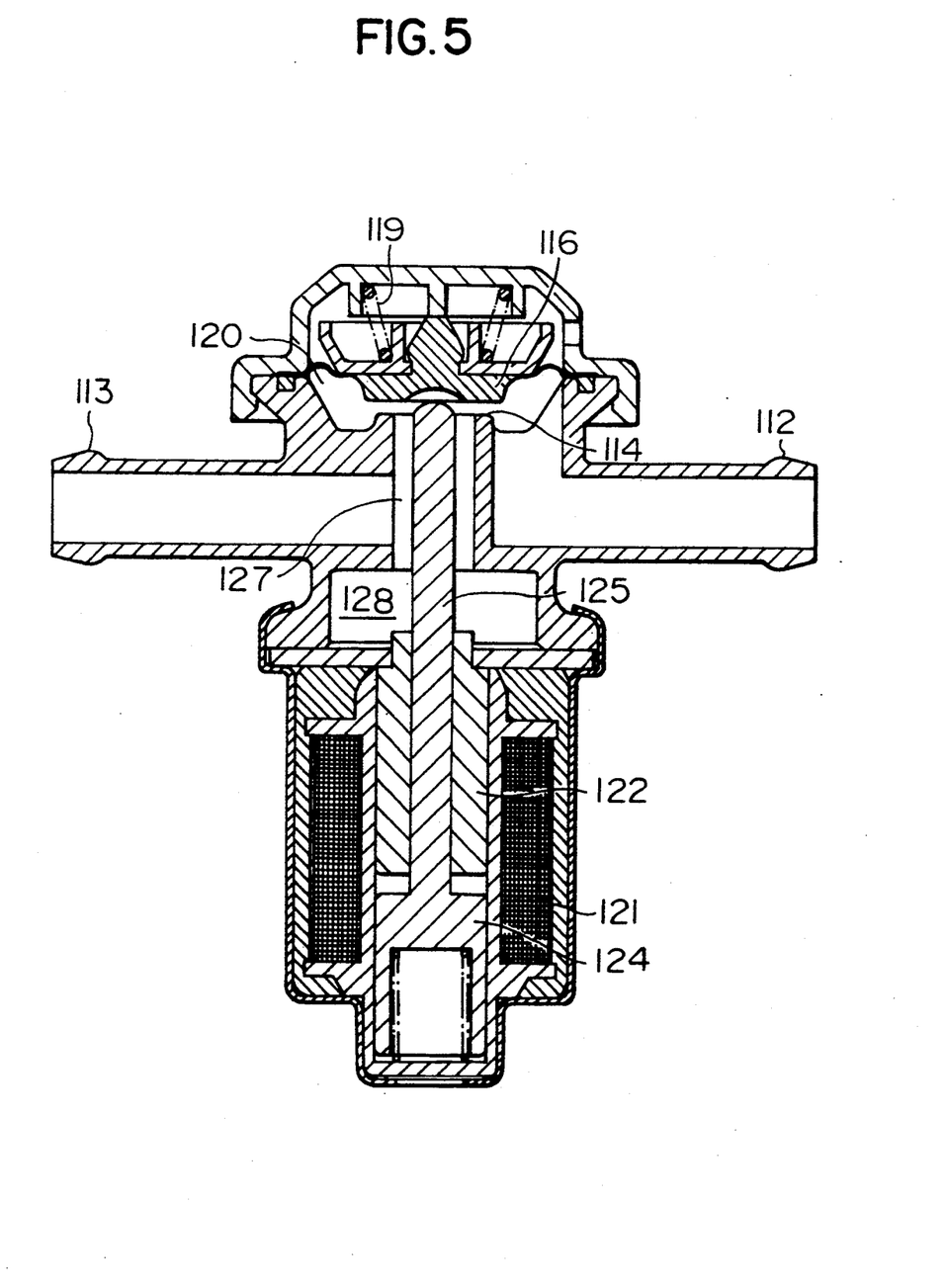
FIG. 5 is a view showing a different condition of the vertical cross-sectional view of the third embodiment in FIG. 4.
Figure 6:
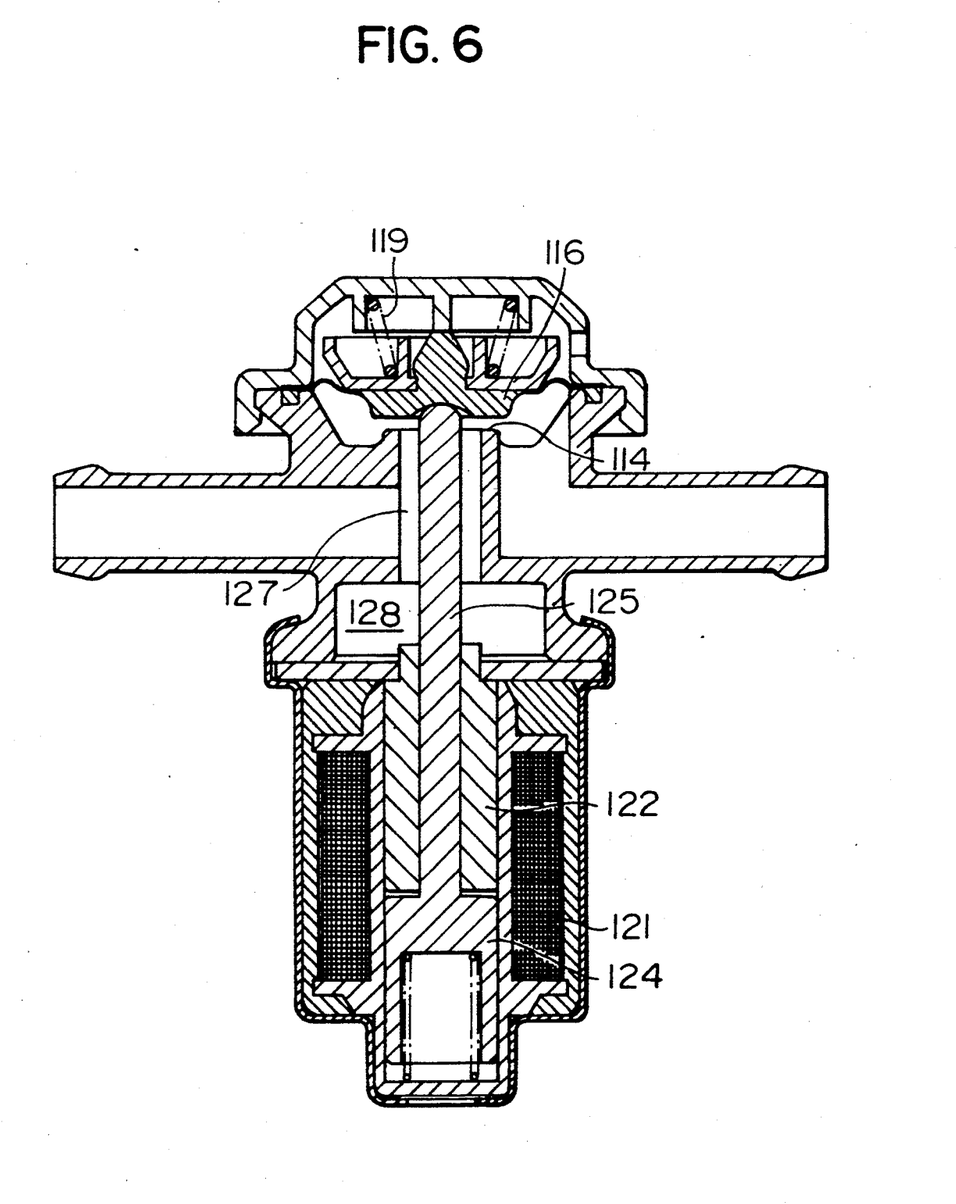
FIG. 6 is a view showing another different condition of the vertical cross-sectional view of the third embodiment in FIG. 4.

Next, FIGS. 4 to 6 show a third embodiment according to the present invention, in which reference numeral 111 denotes a valve body, 112 an inflow port, 113 an outflow port, 114 an annular valve seat, and 115 a diaphragm made of rubber. A valve disk 116 is integrally formed in the center of the diaphragm 115.

The outer peripheral edge of the diaphragm 115 is hermetically held between the valve body 111 and a cover 117. A shell 118 is disposed in contact with the upper surface of the diaphragm 115, and a compression spring 119 is interposed between the shell 118 and the cover 117 and urges the valve disk 116 downwardly to bring it into contact with the valve seat 114.

A diaphragm chamber 120 is formed on the lower side of the diaphragm 115 and communicates with the inflow port 112.

Reference numeral 121 denotes an electromagnetic solenoid, and 122 denotes a stator which is fixed on the valve body 111 through a disk 123. The stator 122 has a cylindrical shape, and a rod (a small-diameter portion) 125 of a plunger 124 is closely inserted in a vertical through hole in the center of the stator 122. The upper end of the rod 125 is engaged with the lower end of a central portion of the valve disk 116. The lower end may have a concave or flat surface on the abutting position.

A spring 126 urges the plunger 124 upwardly with a small force. The urging force is set at a lower value than that of the foregoing spring 119 and determined, for example, at substantially the same level as the mass of the plunger 124.

A communicating passage 127 introduces a fluid from the valve seat 114 into the outflow port 113. An air damper chamber 128 is formed on the upper portion of the electromagnetic solenoid 121 and communicates with the communicating passage 127.

The operation of the third embodiment with the above-described structure will now be described.

When the electromagnetic solenoid 121 is not energized, the plunger 124 and the rod 125 are located at lower positions, as shown in FIG. 5.

In accordance with the internal pressure of the fuel tank applied to the diaphragm chamber 120 from the inflow port 112, the valve disk 116 is moved upwardly against the force of the spring 119 and detached from the valve seat 114, thereby opening the valve. Thus, evaporated fuel from the fuel tank flows through the communicating passage 127 and the outflow port 113, enters a canister not shown, and is absorbed by activated carbon.

The air damper chamber 128 prevents pulsation of the pressure of evaporated fuel which flows toward the outflow port 113, and improves the valve controllability.

At the time of a diagnostic check, as shown in FIG. 6, the electromagnetic solenoid 121 is energized, and the plunger 124 is attracted to the stator 122 by the electromagnetic force. The plunger 124 moved upwardly with the rod 125 causes the valve disk 116 to be detached from the valve seat 114 against the force of the spring 119.

Therefore, even if the valve is adhered by a viscous matter, the valve is forcibly opened by the electromagnetic force.

Figure 7:
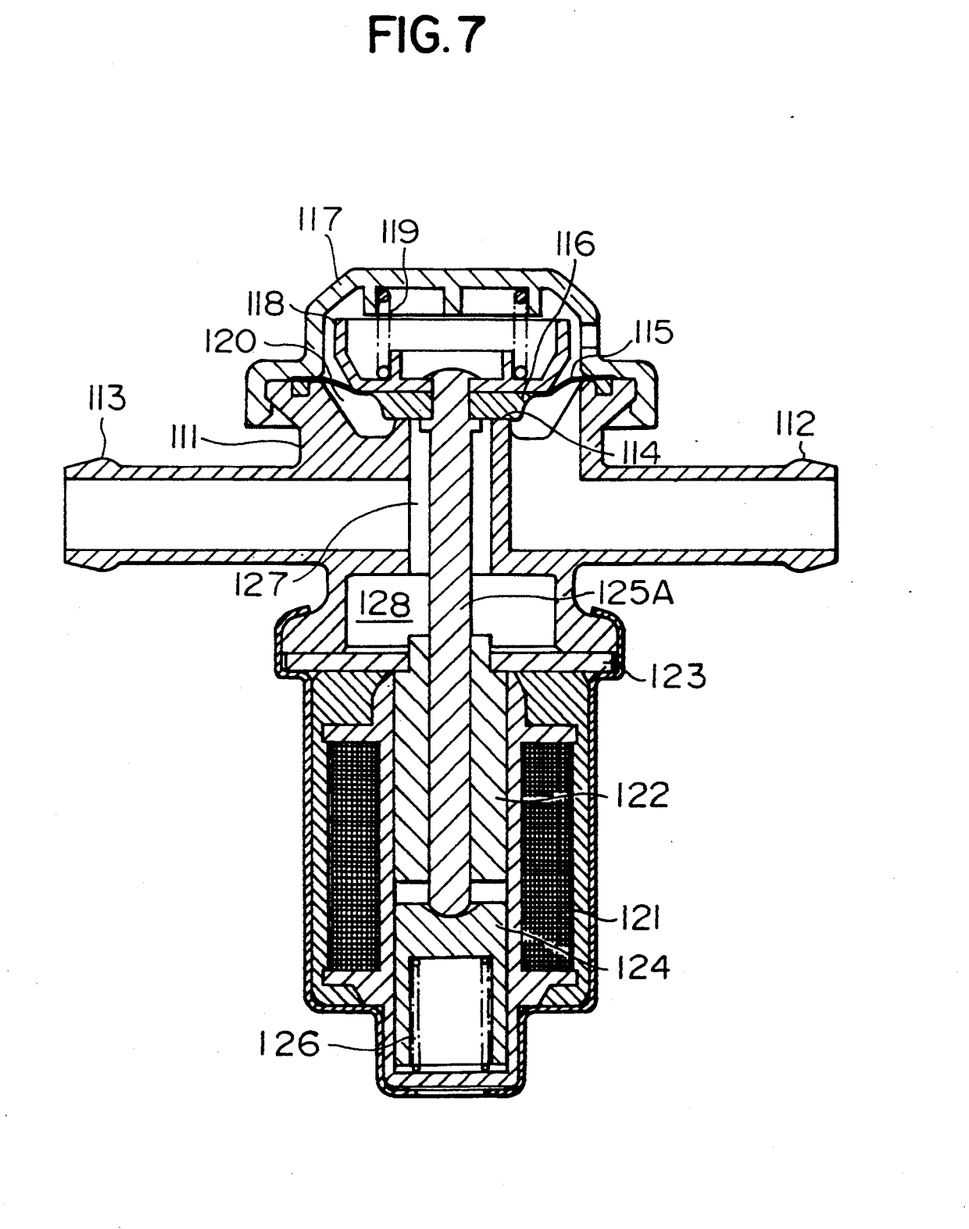
FIG. 7 is a vertical cross-sectional view showing a fourth embodiment according to the invention.

FIG. 7 shows a fourth embodiment according to the present invention, in which a rod 125A having an upper end secured, by caulking, in the center of a valve disk 116 is provided in place of the rod 125 integrally formed with the plunger 124 in the above-described third embodiment. The lower end of the rod 125A abuts against the upper end of a plunger 124. The lower end may have a concave or flat surface on the abutting position.

The length of the rod 125A is determined in such a manner that when an electromagnetic solenoid 121 is not energized, and when the pressure of evaporated fuel from an inflow port 112 is below a preset value, the valve disk 116 is closely contacted with a valve seat 114, as shown in FIG. 7, and also, the lower end of the rod 125A abuts against the upper end of the plunger 124.

Similarly to the above embodiment, in this embodiment, when the electromagnetic solenoid 121 is energized at the time of a diagnostic check, the plunger 124 is attracted to a stator 122 by the electromagnetic force, and the rod 125A is moved upwardly to detach the valve disk 116 from the valve seat 114 forcibly.

Consequently, the valve for controlling the flow rate of evaporated fuel and the valve for the diagnostic check can be integrated with each other and provided between the fuel tank and the canister, and also, adhesion of the valve can be prevented.

With the above-described structure, therefore, the valve adhered by a viscous matter can be forcibly opened by the electromagnetic force, thus preventing adhesion of the valve and improving its reliability.

What is claimed is:

1. A flow rate control valve comprising:
   a communicating passage which has openings on opposite ends and includes a first valve seat which surrounds one of the openings and a second valve seat which surrounds the other opening;
   an outflow port which communicates with an intermediate portion of said communicating passage;
   a first valve disk disposed at a corresponding position to said first valve seat; a diaphragm connected to said first valve disk; a diaphragm chamber formed on one side of said diaphragm; a spring which urges said first valve disk in the valve closing direction;
   a second valve disk disposed at a corresponding position to said second valve seat; an electromagnetic solenoid which opens/closes said second valve disk; a valve chamber formed around said second valve disk; and
   an inflow port which communicates with said diaphragm chamber and said valve chamber.

2. A flow rate control valve comprising:
   a communicating passage which communicates with an outflow port on one end thereof and includes a valve seat which surrounds an opening on the other end;
   a valve disk disposed at a corresponding position to said valve seat; a diaphragm which is connected to said valve disk and includes a diaphragm chamber formed on one side thereof; a first spring which in a valve closing condition urges said valve disk in the valve closing direction; a second spring which in a valve opening condition urges said valve disk in the valve opening direction against the bias of said first spring;
   an inflow port which communicates with said diaphragm chamber;
   an electromagnetic solenoid which operates to open/close said valve disk; and
   an air damper chamber disposed downstream from and at a rear portion of the valve seat.

3. A flow rate control valve having a spring which presses a valve disk formed on a diaphragm so as to bring it into contact with a valve seat, and an electromagnetic solenoid including a plunger which urges said valve disk in such a direction as to detach it from said valve seat against the force of said spring when the electromagnetic solenoid is energized, so that when the electromagnetic solenoid is not energized, said valve disk is detached from said valve seat by a degree in accordance with a pressure exerted on said diaphragm, to thereby control the flow rate.

4. A flow rate control valve according to claim 3, wherein said diaphragm is made of rubber.

* * * * *